(12) United States Patent
Marmora et al.

(10) Patent No.: US 12,407,218 B1
(45) Date of Patent: Sep. 2, 2025

(54) ELECTRIC VEHICLE WHEEL MOUNTED GENERATOR

(71) Applicants: Sonia Marmora, Middletown, OH (US); John Marmora, Middletown, OH (US)

(72) Inventors: Sonia Marmora, Middletown, OH (US); John Marmora, Middletown, OH (US)

( * ) Notice: Subject to any disclaimer, the term of this patent is extended or adjusted under 35 U.S.C. 154(b) by 697 days.

(21) Appl. No.: 17/748,229

(22) Filed: May 19, 2022

(51) Int. Cl.
    *H02K 7/18* (2006.01)
    *B60L 7/14* (2006.01)

(52) U.S. Cl.
    CPC .............. *H02K 7/1846* (2013.01); *B60L 7/14* (2013.01)

(58) Field of Classification Search
    CPC ............................ B60K 7/0007; H02K 7/1846
    See application file for complete search history.

(56) References Cited

U.S. PATENT DOCUMENTS

| | | | | |
|---|---|---|---|---|
| 4,761,577 A * | 8/1988 | Thomas | ............... | H02K 7/1846 310/67 A |
| 8,853,869 B2 * | 10/2014 | Nikolic | ................ | H02K 7/116 290/1 R |
| 2010/0065350 A1 * | 3/2010 | Gashi | ................... | F16D 49/08 188/18 R |
| 2011/0048827 A1 * | 3/2011 | Cherney | .................. | B60L 7/02 180/65.245 |
| 2016/0126805 A1 * | 5/2016 | Fiseni | ................. | H02K 7/1846 290/1 A |
| 2016/0254725 A1 * | 9/2016 | Angelis | ................ | H02K 7/1846 310/156.08 |
| 2017/0214297 A1 * | 7/2017 | Lesesky | ................ | B60C 23/041 |
| 2018/0138782 A1 * | 5/2018 | Diengsleder | ......... | H02K 16/005 |
| 2021/0017958 A1 * | 1/2021 | Pisharodi | .............. | H02K 7/003 |
| 2021/0178813 A1 * | 6/2021 | Stoecker | .............. | B60B 35/006 |

* cited by examiner

*Primary Examiner* — Erez Gurari
(74) *Attorney, Agent, or Firm* — Sanchelima & Associates, P.A.; Jesus Sanchelima; Christian Sanchelima

(57) ABSTRACT

An electric vehicle wheel mounted generator including a vehicle wheel assembly connected to a battery assembly in the inner side bottom of an electric vehicle assembly. The vehicle wheel assembly includes vehicle wheel members with a generator attached therein which include stator coils and magnetic coils to provide electricity while electric vehicle assembly rolls. The battery assembly includes a battery which is provided with electricity by the generator with wires. Battery is connected to a switch that allows to change the power supply for the electric vehicle assembly as an external battery. Electric vehicle assembly includes an electric vehicle which has vehicle brakes attached to the vehicle wheel members. Generator saves the current in the battery and is activated by the switch when required a vehicle battery does not have enough battery.

5 Claims, 4 Drawing Sheets

ELECTRIC VEHICLE WHEEL MOUNTED GENERATOR

1. Fiel of the Invention

Figure 1:
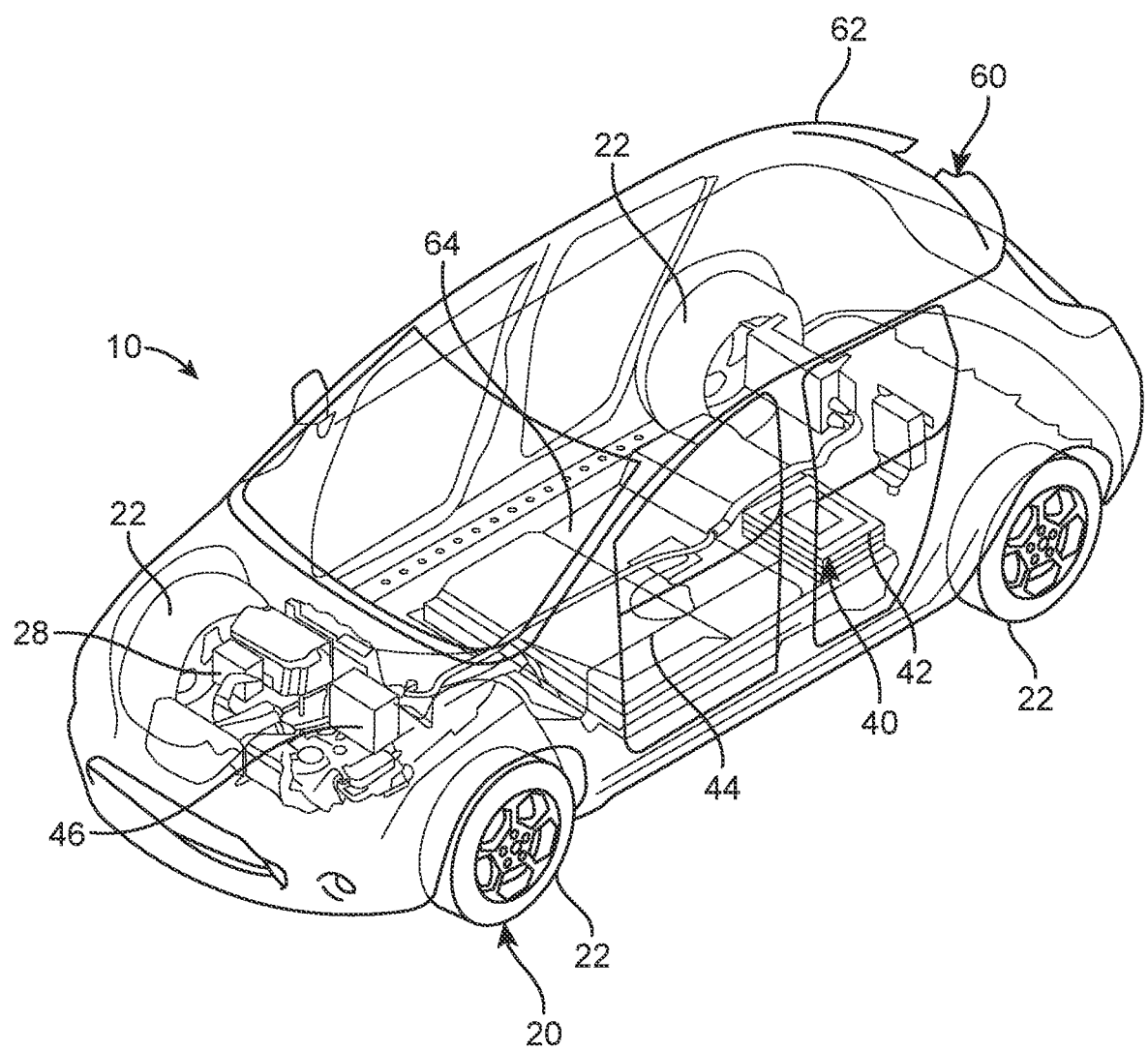

The present invention relates to an electric vehicle wheel mounted generator and, more particularly, to an electric vehicle wheel mounted generator that includes magnetic coils placed at the perimeter of the inside of the vehicle wheel in addition with a stator attached to the vehicle brakes that creates electricity during rotation of wheels to accumulate that electricity to a supplemental battery to give a longer duration of battery to vehicle between charges.

2. Description of the Related Art

Several designs for an electric vehicle wheel mounted generator have been designed in the past. None of them, however, include magnetic coils attached to the perimeter of the inside of wheels and a stator mounted to vehicle brakes that produce electricity stored in a supplemental battery that can be configured to be used as external battery from main battery system of vehicle.

Applicant believes that a related reference corresponds to U.S. Pat. No. 4,761,577 issued for a wheel mounted electricity generator for a vehicle. Applicant believes that another related reference corresponds to U.S. Pat. No. 8,853,869 issued for a self-charging electric vehicle comprising wheel mounted magnetic coil generators which supply electricity to the batteries when depleted. None of these references, however, teach of an electricity generator system for and electric vehicle wherein the generators are located at each wheel comprising a magnetic coil located around the perimeter of the inside of the vehicle wheel and a stator mounted to the vehicle brakes wherein the rotation of the wheel creates electricity which can be stores in a supplemental battery for extending the range of the vehicle in between charges.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide magnetic coils located around the perimeter of the inside of vehicle wheels that generate electricity during rotation.

It is another object of this invention to provide a cleaning system by bristles attached to said system to dislodge and clean debris from magnets to deliver balance in wheels due clean magnets.

It is still another object of the present invention to provide an extended additional battery system for reaching longer distances in an electric vehicle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an operational view of the present invention 10 wherein is shown the vehicle wheel assembly 20 connected to the battery assembly 40 by wires 44.

Figure 2:
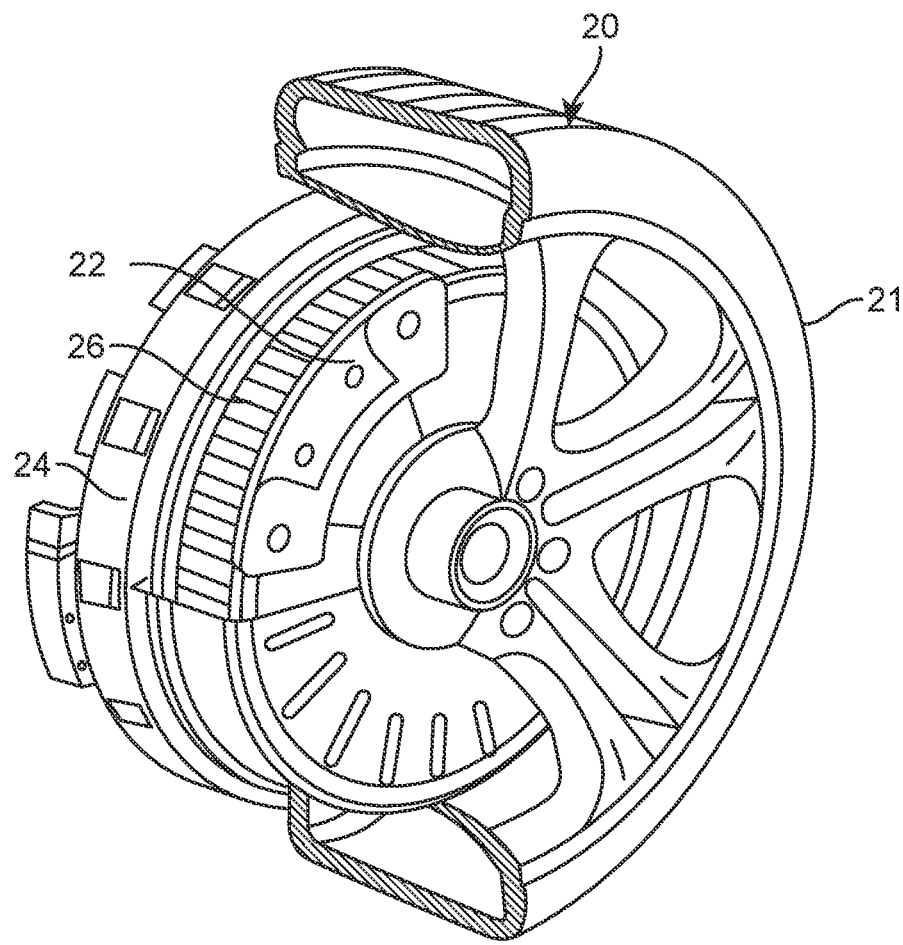

FIG. 2 shows a perspective view of the vehicle assembly 20 wherein one of the vehicle wheel members 22 includes one of the stator coils 24 placed on one of the vehicle wheel members 22 including one of the magnetic coils 26.

Figure 3:
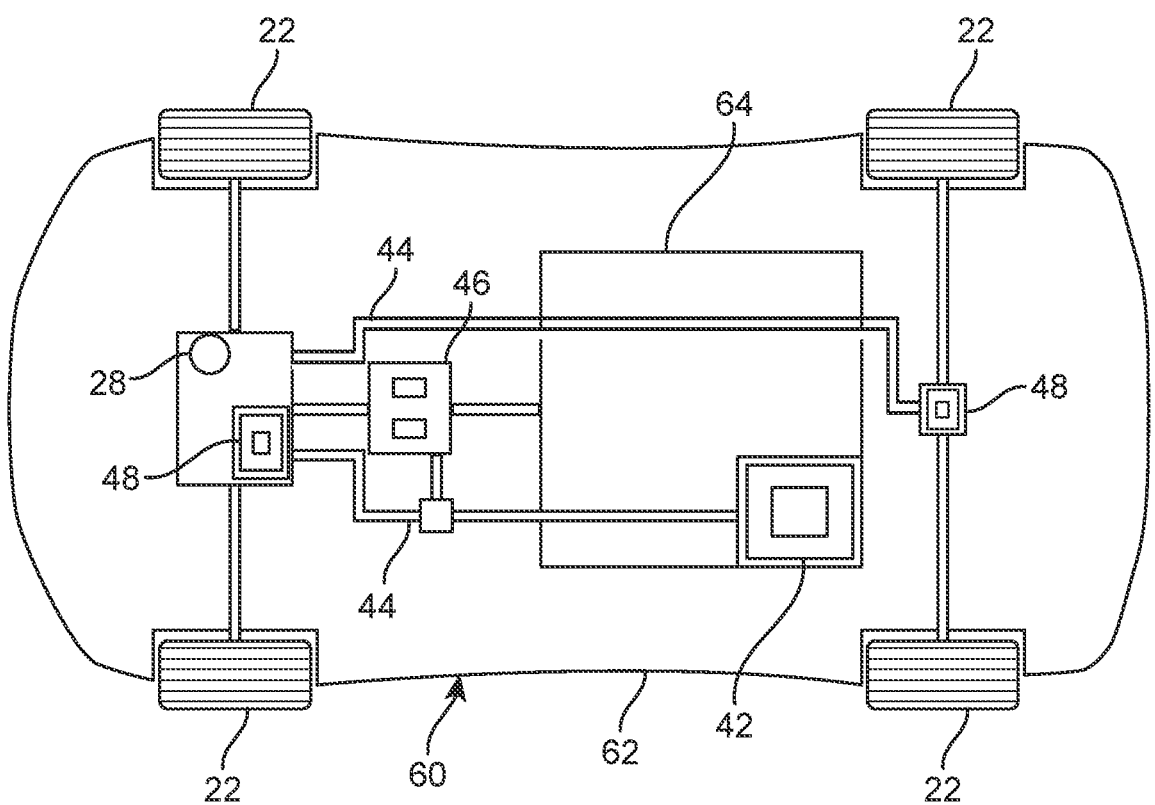

FIG. 3 illustrates a diagram of the vehicle wheel assembly 20 with the battery assembly 40 attached to the inner bottom portion of the vehicle assembly 60.

Figure 4:
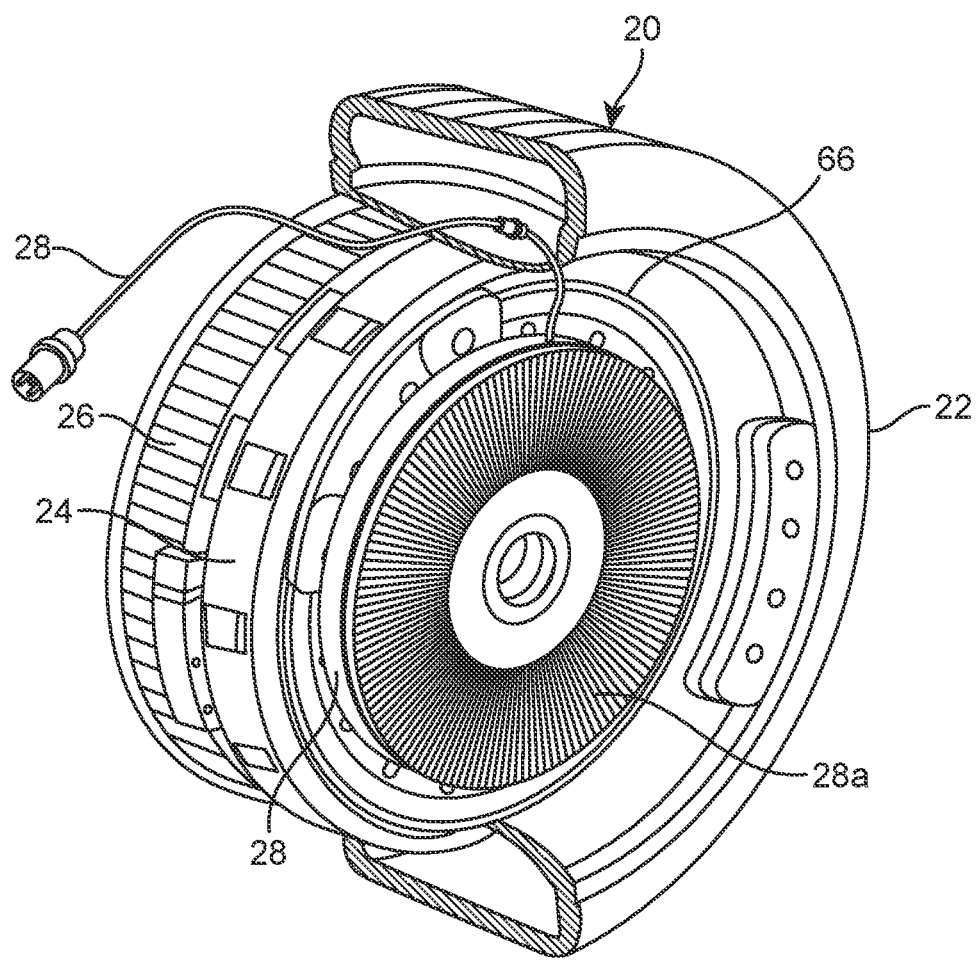

FIG. 4 is a representation of a perspective sectional view of the vehicle wheel assembly 20 wherein a pickup coil 26 is connected to one of the vehicle brakes 66. Cleaners 28a are attached to the generator 22.

V. DETAILED DESCRIPTION OF THE EMBODIMENTS OF THE INVENTION

Referring now to the drawings, where the present invention is generally referred to with numeral 10, it can be observed that it basically includes a vehicle wheel assembly 20, a battery assembly 40 and an electric vehicle assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The vehicle wheel assembly 20 includes vehicle wheel members 21, generators 22, wheel spokes 22a, stator coils 24, magnetic coils 28, cleaner 28a, bristles 28b. In a suitable embodiment each of the vehicle wheel members 21 may be a housing for each of the generators 22. Vehicle wheel members 21 may be made of a rubber material with steel. In one embodiment vehicle wheel members 21 may have attached stator coils 24 to each of the vehicle wheel members 21 including also magnetic coils 26 considering further the electric vehicle assembly 60. Vehicle wheel members 21 may be configured to rotate and create current to provide to the battery assembly 40 by the generators 22. Vehicle wheel members 21 may be placed in a normal wheel car configuration. Generators 22 may be attached to the inner of the spokes of each of the vehicle wheel members 21. In a suitable embodiment, generators 22, stator coils 24 and magnetic coils 26 may be made of a steel material. Nevertheless, in other embodiments generators 22 may be made of a metal material, stainless steel material, copper material, cobalt material, nickel material, aluminum material or any other material that may present magnetic properties may be suitable for generators 22, stator coils 24 and magnetic coils 26. Generators 22 may be configured to provide current to the battery assembly 40 which may be produced by the stator coils 24 and the magnetic coils 26 which are placed on each of the vehicle wheel members 21. In a preferred embodiment, generators 22 may have a body that conforms with the body of the vehicle wheel members 21.

As best observed in FIG. 2, one of the generators 22 may be attached in the inner side of one of the vehicle wheel members 21. Generators 22 may be constructed by stator coils 24 and magnetic coils 26. In one embodiment generator, 22 may be a type of DC series motor. In other embodiments generators 22 may be a brushless DC motors, Permanent Magnet Synchronous Motor, Three Phase AC induction Motors, Switched Reluctance Motors, or any other variation thereof. Stator coils 24 may be a housing for the magnetic coils 26. It is to be considered that each of the generators 22 may have each of the stator coils 24 wherein each of the magnetic coils 26 is fastened thereof which produces electrical current when rotating. Stator coils 24 may be configured to convert the rotating magnetic field produced when magnetic coils 26 rotate to electric current. Stator coils 24 may be suitable to have a body that conforms with the shape of the body of each of the vehicle wheel members 21. In a suitable embodiment, each of the stator coils 24 may be attached to each of the spokes of the vehicle wheel members 21. Magnetic coils 26 may be suitable to have a shape that conforms with the shape of each of the vehicle wheel members 21.

As best observed in FIG. 4, one of the pick up coils 28 may be attached to the magnetic coils 26. In a suitable embodiment, pick up coils 28 may present a wire body with a cylindrical body. In a preferred embodiment, pick up coils 28 may be configured to allow the battery 42 to be charged with the current obtained by the generators 22. In one embodiment, pick up coils 28 may be made of a metal material. Nevertheless, in other embodiments, pick up coils 28 may be made of a stainless-steel material, copper material, cobalt material, nickel material, aluminum material or any other material Cleaners 28a may have a body that conforms with each of the spokes of the vehicle wheel members 21. Cleaners 28a may allow to remove metal debris from the magnetism that is collected by the generators 22. In a suitable embodiment, cleaners 28a may be attached next to each of the vehicle wheel members 21. In one embodiment cleaner 28a may be made of a rigid rubber material. Nevertheless, other materials like polymer, plastic, copper, or any other material may be suitable for cleaners 28a.

The battery assembly 40 includes a battery 42, wires 44, a switch 46, amplifier 48 and diodes 48. In a suitable embodiment battery 42 may have a square prism body as best observed in FIG. 1. Battery 42 may be attached to an inner portion of the electric vehicle assembly 80. In one embodiment battery 42 may be placed in a bottom portion of the electric vehicle assembly 80. Battery 42 may be configured to be activated when electric vehicle assembly 80 leaks from energy. It is to be considered that battery 42 may be provided with current by the generators 22 of each of the vehicle wheel members 21. It is to be considered that battery 22 may be a type of lithium-ion battery considering materials, lithium, nickel, and cobalt. Nevertheless, in other embodiments, materials like lithium-iron-phosphate may be suitable for battery 42. Battery 42 may include wires 44 which are connected to the switch 46 amplifier 48 and diodes 48. In a preferred embodiment, wires 44 may allow the generator 22 to provide electricity to the battery 42. Wires 44 may have a large thin cylindrical body. Wires 44 may be made of aluminum. Nevertheless, in another embodiment, wires 44 may be made of a copper material. As best shown in FIG. 3, wires 44 may be connected in the inner bottom portion of the electric vehicle assembly 60. In a suitable embodiment switch 46 may be placed in the inner bottom of the electric vehicle assembly 60 connected by the wires 44b.

The switch 46 may have a rectangular prism body. It is to be understood that switch 46 may allow to change the electricity supply for the electric vehicle assembly 60. Switch 46 may be made of a steel material with electrical components. Switch 46 is connected by the wires 44 which connect battery 42 and vehicle battery 64. In a preferred embodiment, it is to be considered that switch 46 may be interlocked by the wires 44 which send the electricity from the generators 22 to the switch 46. It is to be considered that diodes 48 may allow the current flows in one direction to avoid failures in the current system. Diodes 48 may present a square body and may be connected to each of the generators 22 by the wires 44. Diodes 48 may be made of a silicon material. Nevertheless, in other embodiments, diodes 48 may be made of a germanium material or selenium material with additional metals added. Each of the diodes 48 may be attached to a central portion wherein the generators 22 provided the current by each of the pick up coils 28 which flows by the wires 44, The electric vehicle assembly 60, includes an electric vehicle 62, a vehicle battery 64 and vehicle breaks 66. Electric vehicle 62 may include a vehicle battery 64 which may be integrated in an internal portion thereof. Vehicle battery 64 may be connected by the wires 44 to the switch 46 and may be deactivated to allow battery 42 to provide the electricity to electric vehicle 62 when vehicle battery 64 has a leak of electricity. In a suitable embodiment, each of the vehicle brakes 66 may be the housing for each of the generators 22 wherein stator coils 24 and magnetic coils 26 are attached thereof.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electric vehicle wheel mounted generator, comprising:
    a vehicle wheel assembly including vehicle wheel members wherein each of the vehicle wheel members have a generator comprising a stator coil from stator coils and a magnetic coil from the magnetic coils, wherein each of the vehicle wheel members includes cleaners which allow to remove debris from magnets;
    a battery assembly including a battery wherein said battery is provided of electricity by said generators from the vehicle wheel members via wires and diodes that direct current flow: and
    an electric vehicle assembly including an electric vehicle wherein said electric vehicle includes a battery placed in the inner bottom portion thereof as a base for said battery.

2. The electric vehicle wheel mounted generator of claim 1, wherein said generator coils and stator coils have a circular shape that conforms with the shape of a spoke of the vehicle wheel members.

3. The electric vehicle wheel mounted generator of claim 1, wherein said stator coils allows pick up coils to provide the current to said diodes.

4. The electric vehicle wheel mounted generator of claim 3, wherein said diodes receive the current from wires that are connected to the vehicle wheel members by the pick up coils.

5. The electric vehicle wheel mounted generator of claim 1, wherein said electric vehicle has vehicle brakes for holding said generators.

\* \* \* \* \*